US008829835B2

(12) United States Patent
Nakagawara

(10) Patent No.: US 8,829,835 B2
(45) Date of Patent: Sep. 9, 2014

(54) CONTROLLER OF A MOTOR AND METHOD OF CONTROLLING THE SAME

(75) Inventor: Chikashi Nakagawara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 922 days.

(21) Appl. No.: 12/875,960

(22) Filed: Sep. 3, 2010

(65) Prior Publication Data

US 2011/0181215 A1    Jul. 28, 2011

(30) Foreign Application Priority Data

Jan. 28, 2010 (JP) ................. 2010-016912

(51) Int. Cl.
H02H 7/08 (2006.01)
H02P 29/02 (2006.01)
H02P 6/20 (2006.01)
H02P 6/18 (2006.01)

(52) U.S. Cl.
CPC ............. *H02P 29/027* (2013.01); *H02P 6/20* (2013.01); *H02P 6/182* (2013.01)
USPC ............ 318/400.21; 318/400.22; 318/400.03; 318/434

(58) Field of Classification Search
USPC ............. 318/400.03, 400.06, 400.11, 400.21, 318/400.22, 400.38, 434
See application file for complete search history.

(56) References Cited

U.S. PATENT DOCUMENTS 3,829,747 A * 8/1974 Woolfson et al. ............ 318/702
5,744,927 A * 4/1998 Hayashida .................... 318/599
7,859,205 B2 * 12/2010 Mori et al. .................... 318/379
8,159,162 B2 * 4/2012 Kanamori ................. 318/400.11
8,305,020 B2 * 11/2012 Suzuki et al. ............ 318/400.21
2010/0237809 A1 * 9/2010 Ogahara ................... 318/400.13

FOREIGN PATENT DOCUMENTS

JP    04-317587     11/1992
JP    H06-351285 A  12/1994
JP    07-327394     12/1995

(Continued)

OTHER PUBLICATIONS

Office Action for Japanese Patent Application No. 2010-016912, dated Jun. 28, 2013, English translation pp. 1-3, 7 pages.

(Continued)

*Primary Examiner* — Eduardo Colon Santana
*Assistant Examiner* — Thai Dinh
(74) *Attorney, Agent, or Firm* — Patterson & Sheridan, LLP

(57) ABSTRACT

According to one embodiment, a controller of a motor includes a driving signal output module, a position detector, a determiner, and an over current detector. The driving signal output module is configured to generate a driving signal for generating a driving current of a motor, a duty ratio of the driving signal being depending on an over current detection signal. The position detector is configured to generate a position detection signal for determining an operating status of the motor by comparing an induction voltage generated by a rotation of a rotor of the motor by the driving current with a predetermined reference voltage. The determiner is configured to determine whether the motor is in a starting state where a rotating frequency of the rotor is smaller than a predetermined value or in a steady state where the rotating frequency of the rotor is equal to or higher than the predetermined value based on the position detection signal. The over current detector is configured to output a comparison result as the over current detection signal in accordance with a determination result of the determiner.

16 Claims, 10 Drawing Sheets

(56) References Cited

FOREIGN PATENT DOCUMENTS

| JP | 09-140185 | 5/1997 |
|---|---|---|
| JP | H10-337079 A | 12/1998 |
| JP | 2001-275392 | 10/2001 |
| JP | 2007-202330 A | 8/2007 |

OTHER PUBLICATIONS

Japanese Office Action dated Jan. 21, 2014, filed in Japanese counterpart Application No. 2010-016912, 6 pages (with translation).

* cited by examiner

CONTROLLER OF A MOTOR AND METHOD OF CONTROLLING THE SAME

CROSS REFERENCE TO RELATED APPLICATIONS

This application is based upon and claims the benefit of priority from the prior Japanese Patent Application No. 2010-16912, filed on 28, Jan., 2010, the entire contents of which are incorporated herein by reference.

FIELD

Embodiments described herein relate generally to a controller of a motor and a method of controlling the same.

BACKGROUND

A sensorless DC motor does not have a position sensor for detecting a position of a rotor and can be downsized. Therefore, the sensorless DC motor is widely used for vehicle installations and home electric appliances.

The sensorless DC motor is, for example, driven by a PWM (Pulse Width Modulation) signal. A controller of the sensorless DC motor has a function for detecting a driving current. When the driving current is over a threshold, the controller determines to be an over current and lowers a duty ratio of the PWM signal. Because of this, the controller can prevent the sensorless motor from being burned-out.

Generally, because the threshold for detecting the over current is constant, there is a likelihood that the sensorless DC motor has following problems on starting the sensorless DC motor. For example, when driving the sensorless DC motor having a small torque characteristic with heavy inertia, it is necessary to generate a large driving current on starting the sensorless DC motor. However, if the threshold for detecting the over current is set low in order to prevent the sensorless DC motor from being burned-out, it may take a long time for the sensorless DC motor to follow up a forced commutation frequency on starting the sensorless DC motor. Contrarily, when driving the sensorless DC motor having a large torque characteristic with light inertia, if the threshold for detecting the over current is set high in order to prevent the over current from being detected more than necessary, a large driving current may be generated on starting, and an over drive where a rotation frequency of the rotor much exceeds the forced commutation frequency may occur.

JP-A No. 2001-275392 (Kokai) (hereinafter, "Patent Document 1") discloses a technique for driving the sensorless DC motor so as not to exceed the threshold for detecting the over current on starting. However, by the technique of Patent Document 1, when driving the sensorless DC motor having a small torque characteristic with heavy inertia, it is difficult to set the sensorless DC motor to be a steady state quickly.

JP-A No. 4-317587 (Kokai) (hereinafter, "Patent Document 2") discloses a technique to shift a self starting frequency, which is a frequency on starting the sensorless DC motor", from high frequency to low frequency. However, by the technique of Patent Document 2, because the self starting frequency right after starting is high, the over drive may occur.

DETAILED DESCRIPTION

In general, according to one embodiment, a controller of a motor includes a driving signal output module, a position detector, a determiner, and an over current detector. The driving signal output module is configured to generate a driving signal for generating a driving current of a motor, a duty ratio of the driving signal being depending on an over current detection signal. The position detector is configured to generate a position detection signal for determining an operating status of the motor by comparing an induction voltage generated by a rotation of a rotor of the motor by the driving current with a predetermined reference voltage. The determiner is configured to determine whether the motor is in a starting state where a rotating frequency of the rotor is smaller than a predetermined value or in a steady state where the rotating frequency of the rotor is equal to or higher than the predetermined value based on the position detection signal. The over current detector is configured to output a comparison result as the over current detection signal by comparing a first over current detection voltage with a voltage corresponding to the driving current of the motor when the motor is in the starting state and by comparing a second over current detection voltage which is different from the first over current detection voltage with the voltage corresponding to the driving current of the motor when the motor is in the steady state in accordance with a determination result of the determiner.

Embodiments will now be explained with reference to the accompanying drawings.

(First Embodiment)

Figure 1:
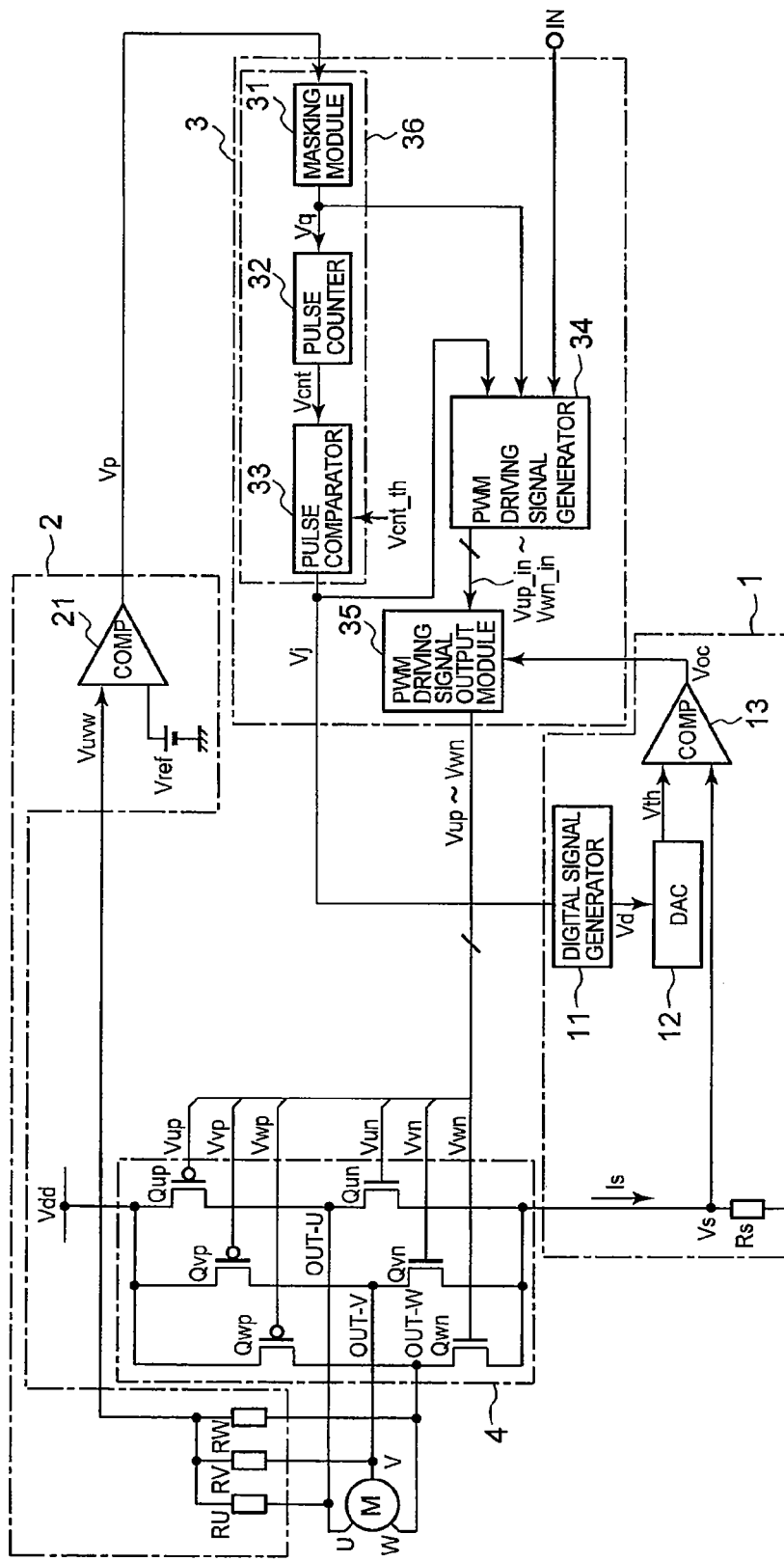
FIG. 1 is a schematic configuration of a controller of a motor and a sensorless DC motor M according to a first embodiment.

FIG. 1 is a schematic configuration of a controller of a motor (hereinafter, "controller") and a sensorless DC motor M (hereinafter, "motor M") according to a first embodiment. The controller has an over current detector 1, a position detector 2, a controlling module 3 and a driver 4. Each part of the controller can be in a chip or at least a part of the controller can be implemented by discrete modules. For example, when the driver 4 has to generate a large current, the driver 4 can be implemented by using the discrete modules, and the other can be in a chip. Furthermore, all of the controller can be implemented by hardware or at least a part of the controller, for example the controlling module 3, can be implemented by software.

The controller and the motor M of FIG. 1 can be installed in a vehicle and used for rotating a water pump.

The over current detector 1 has a resistance Rs, a digital signal generator 11, a DAC (Digital to Analog Converter) 12, an over current detection comparator (COMP) 13, and detects whether or not an over current is generated in the driver 4. The resistance Rs generates a voltage Vs proportional to the driving current generated in the driver 4. The digital signal generator 11 generates a digital signal Vd according to a determination signal Vj outputted from the controlling module 3. The DAC 12 converts the digital signal Vd to an over current detection voltage Vth, which is an analog voltage.

More specifically, the digital signal generator 11 generates a digital signal Vd1 for starting state (first digital signal) when the motor M is in a starting state, and generates a digital signal Vd2 for steady state (second digital signal) when the motor M is in a steady state. The starting state and the steady state will be described below. Furthermore, the DAC 12 generates an over current detection voltage Vth1 for starting state (first over current detection voltage) or an over current detection voltage Vth2 for steady state (second over current detection voltage). Thus, it is one of characteristic features of the present embodiment that different over current detection voltages Vth are generated depending on whether the motor M is in the starting state or in the steady state.

The over current detecting comparator 13 compares the voltage Vs corresponding to the driving current Is with the over current detection voltage Vth. When the voltage Vs corresponding to the driving current Is exceeds the over current detection voltage Vth, the over current detecting comparator 13 sets an over current detection signal Voc to be high, otherwise, sets the over current detection signal Voc to be low.

The position detector 2 has resistances Ru, Rv and Rw, a position detection comparator (CMP) 21, and generates a position detection signal Vp for determining whether the motor M is in the starting state or in the steady state. One end of each of the resistances Ru, Rv and Rw is connected to U, V and W terminals of the motor M, respectively, and the other end is connected in common and connected to the position detecting comparator 21. A voltage of the other end of each resistances Ru, Rv and Rw is a combined voltage Vuvw obtained by combining the voltage of U, V and W terminals of the motor M. In the present embodiments, it is assumed that Ru=Rv=Rw. The position detecting comparator 21 compares the combined voltage Vuvw with a reference voltage Vref. When the combined voltage Vuvw exceeds the reference voltage Vref, the position detecting comparator 21 sets the position detection signal Vp to be high, otherwise, sets the position detection signal Vp to be low. Here, the combined voltage Vuvw is an analog voltage, while the position detection signal Vp is a digital signal.

The controlling module 3 has a masking module 31, a pulse counter 32, a PWM driving signal generator 34 and a PWM driving signal output module 35, and generates six PWM driving signals Vup, Vvp, Vwp, Vun, Vvn and Vwn based on the over current detection signal Voc, the position detection signal Vp and a driving order signal IN inputted from the outside.

The masking module 31 generates a recognition signal Vq by masking operation for removing an undesired pulse generated on the position detection signal Vp when a driving phase changes. The pulse counter 32 counts the number of pulses of the recognition signal Vq. When the count value of the number of the pulses is equal to or exceeds a threshold Vcnt_th, the pulse comparator 33 sets the determination signal Vj to be high, otherwise, sets the determination signal Vj to be low. The determination signal Vj of high corresponds to the steady state, and that of low corresponds to the starting state. In the present embodiment, an example is shown where the threshold Vcnt_th is "2".

A determiner 36 has the masking module 31, the pulse counter 32 and the pulse comparator 33.

The determination signal Vj indicating whether the motor M is in the starting state of in the steady state is inputted to the PWM driving signal generator 34. When the motor is in the starting state, the PWM driving signal generator 34 generates PWM signals Vup_in to Vwn_in corresponding to the six PWM driving signals Vup to Vwn with a predetermined forced commutation frequency. In the present embodiment, the forced commutation frequency is constant, for example, 1000 rpm (round per minute). After that, when the determination signal Vj indicates that the motor M is in the steady state, the PWM driving signal generator 34 generates the PWM signals Vup_in to Vwn_in in synchronization with the recognition signal Vq.

As sated above, the driving manner depends on whether the sensorless DC motor is in the starting state or in the steady state. Because the sensorless DC motor does not have a position sensor for detecting a position of the rotor, the controller detects the position of the rotor based on an induction voltage generated by a rotation of the rotor. However, when the sensorless DC motor is in the starting state, the position cannot be detected because the rotor does not rotate or rotates extremely slowly. Therefore, the PWM driving signal generator 34 generates the PWM signals Vup_in to Vwn_in with the forced commutation frequencies.

On the other hand, when the rotor begins to rotate, the induction voltage occurs on one terminal set to be high impedance, which will be explained below, among the U, V and W terminals of the motor M. When the rotation frequency exceeds a predetermined value, the motor M becomes the steady state where the value of the recognition signal Vq switches in synchronization with the induction voltage. In the steady state, the PWM driving signal generator 34 generates the PWM signals Vup_in to Vwn_in using the switching timing of the recognition signal Vq as a reference. By such a manner, in the steady state, the rotor rotates stably because the PWM signals Vup_in to Vwn_in are generated in synchronization with the induction voltage generated by the rotation of the rotor.

When the over current detection signal Voc is low, the PWM driving signal output module 35 outputs the PWM signals Vup_in to Vwn_in as the PWM driving signals Vup to Vwn as themselves to the driver 4. On the other hand, when the over current detection signal Voc is high, the PWM driving signal output module 35 outputs the PWM driving signals Vup to Vwn whose duty ratio is lowered to the driver 4.

The driver 4 has three PMOS (P-type Metal-Oxide-Semiconductor) transistors Qup, Qvp and Qwp and three NMOS (N-type Metal-Oxide-Semiconductor) transistors Qun, Qvn and Qwn, and drives the motor M by setting the U, V and W terminals of the motor M to be high, low or high-impedance based on the PWM driving signals Vup to Vwn. The MOS transistors Qup and Qun are connected between the power terminal Vdd and the resistance Rs in series, and the connection node OUT-U is connected to the U terminal of the motor M. The other MOS transistors Qvp to Qwn are similar to the MOS transistors Qup and Qun. Furthermore, the PWM driving signals Vup to Vwp are inputted to the gate terminals of the transistors Qup to Qwn, respectively.

The motor M has three coils in star connection among the U, V, and W terminals and the rotor (not shown). The PWM driving signals Vup to Vwn sets one of the PMOS transistors Qup to Qwp and one of the NMOS transistors Qun to Qwn. For example, when the PMOS transistor Qup and the NMOS transistor Qvn are turned on, the driving current Is is generated in the coils of the motor M from the U terminal to the V terminal (hereinafter, this driving current Is is called as a driving current Is of UV phase). Based on the PWM driving signals Vup to Vwn, the driver 4 rotates the rotor by generating the driving current Is of six phases in the coil in the order of UV phase, UW phase, VW phase, VU phase, WU phase and WV phase, for example.

Figure 2:
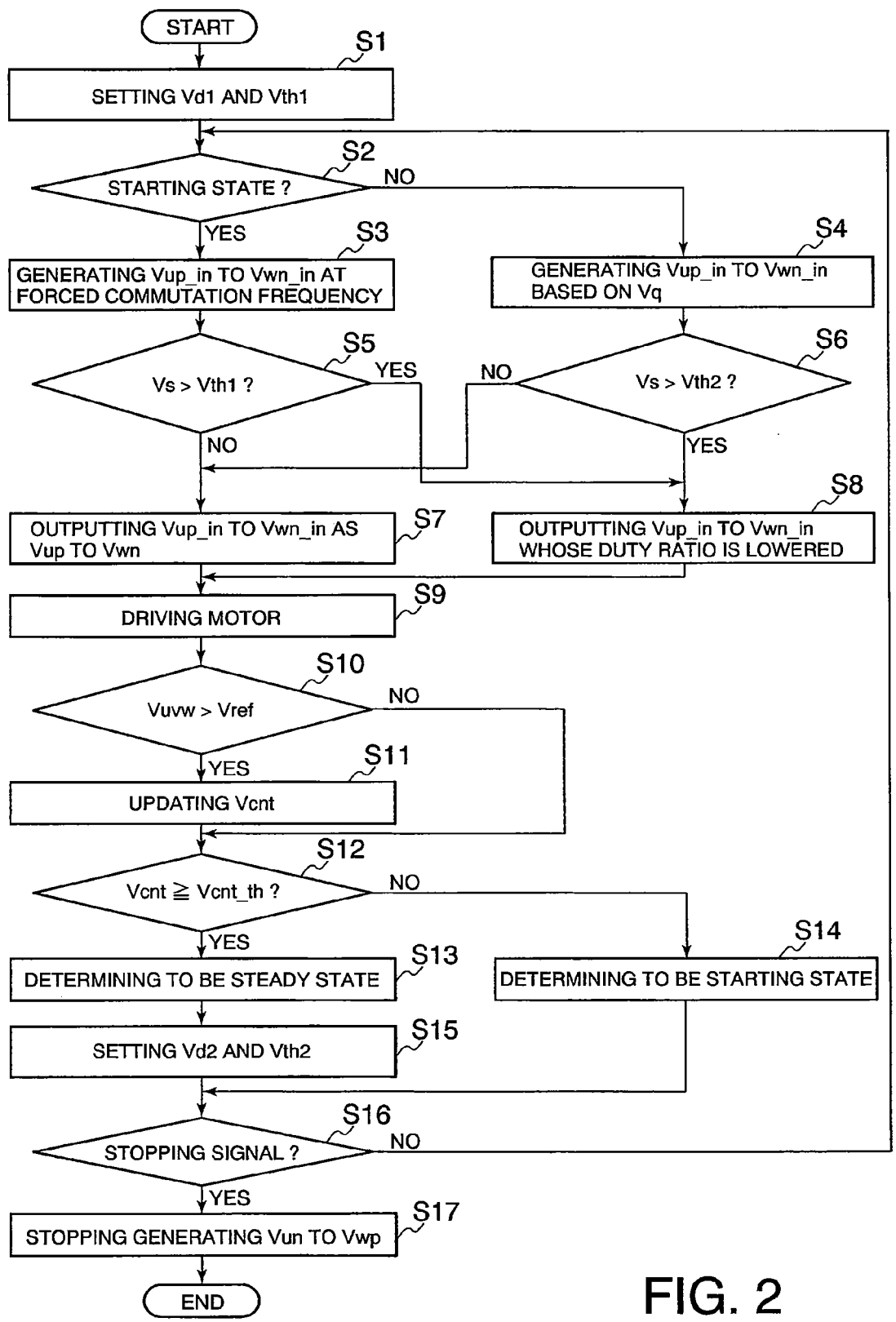
FIG. 2 is a flowchart showing an example of a processing operation of the controller of FIG. 1.
Figure 3:
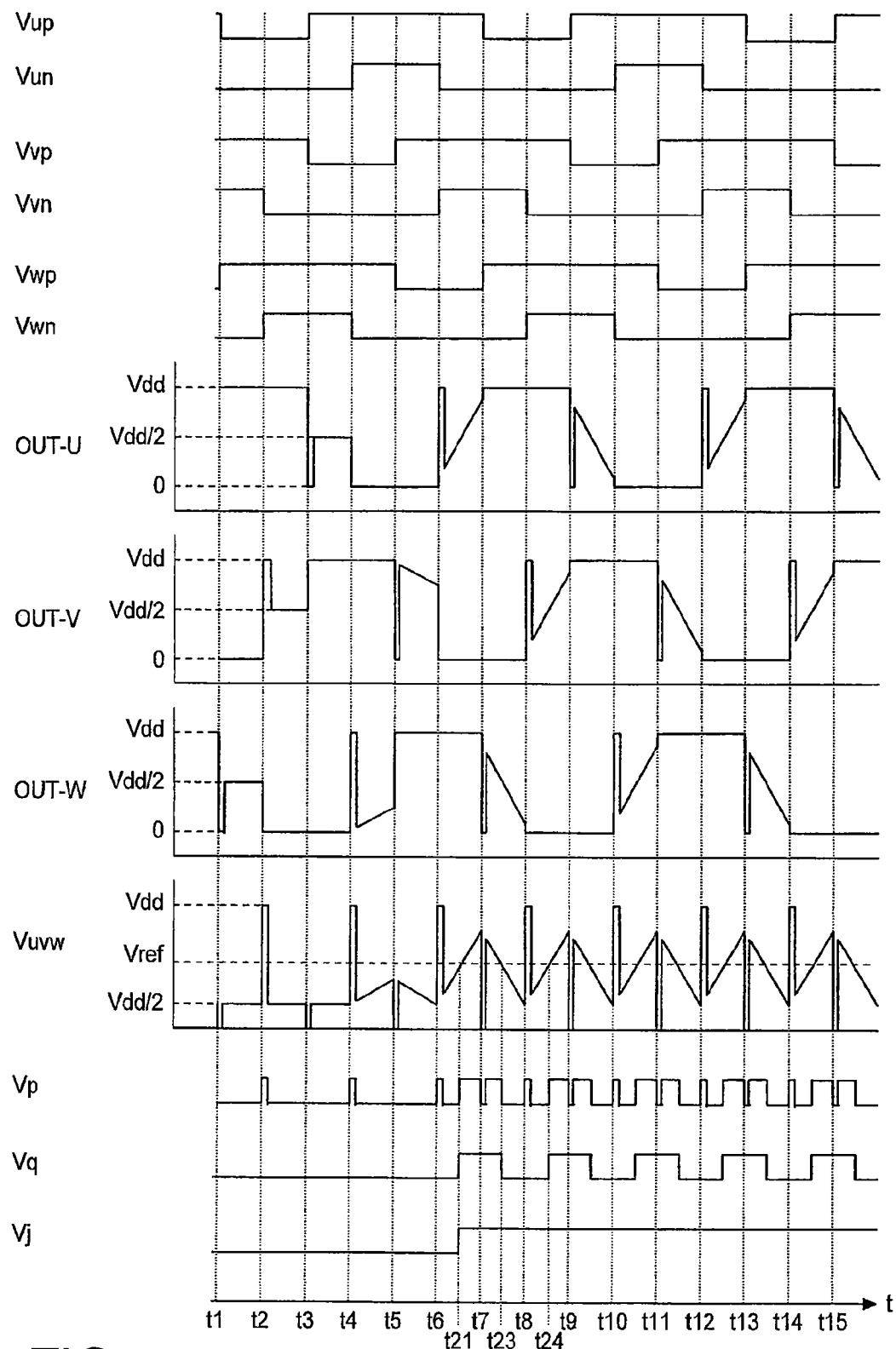
FIG. 3 is a voltage waveform of each part of the controller.

FIG. 2 is a flowchart showing an example of a processing operation of the controller of FIG. 1. FIG. 3 is a voltage waveform of each part of the controller. The vertical axis shows a voltage, and the horizontal axis shows a time. Hereinafter, the processing operations of the controller will be explained, with reference to FIGS. 2 and 3.

Firstly, the driving order signal IN indicates to activate the motor M, the pulse comparator 33 sets the determination signal Vj to be low. Because of this, the digital signal generator 11 sets the digital signal Vd1 for starting state, and the DAC 12 generates the over current detection voltage Vth1 for starting state (Step S1).

Next, the PWM driving signal generator 34 determines whether the motor M is in the starting state or in the steady state based on the determination signal Vj (Step S2). Right after starting, because the determination signal Vj is low, namely, in the starting state (Step S2—YES), the PWM driving signal generator 34 generates the PWM signals Vup_in to Vwn_in with the forced commutation frequency (Step S3).

The PWM driving signal output module 35 determines whether or not the over current is generated based on the over current detection signal Voc. More specifically, in the starting state, the PWM driving signal output module 35 determines whether or not the over current is generated based on the over current detection signal Voc obtained by comparing the voltage Vs corresponding to the driving current Is with the over current detection voltage Vth1 for starting state (Step S5).

When the over current is not generated (Step S5—NO), the PWM driving signal output module 35 outputs the PWM signals Vup_in to Vwn_in generated by the PWM driving signal generator 34 as the PWM driving signals Vup to Vwn as themselves to the driver 4 (Step S7). When the over current is generated (Step S5—YES), the PWM driving signal output module 35 generates the PWM driving signals Vup to Vwn by lowering the duty ratio of the PWM signals Vup_in to Vwn_in generated by the PWM driving signal generator 34 to output them to the driver 4 (Step S8).

Figure 4:
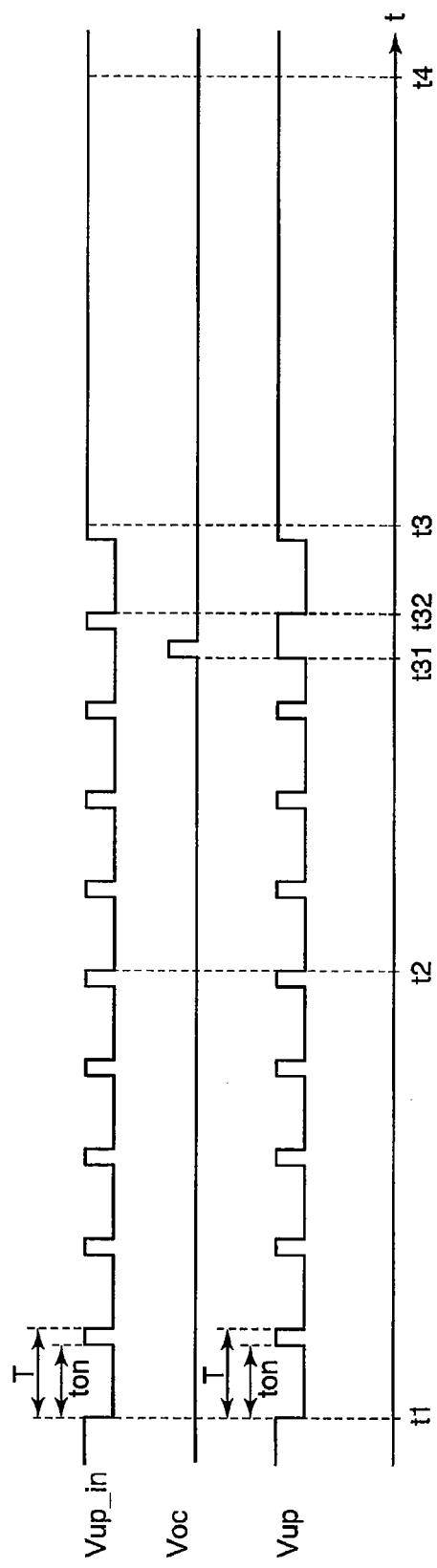
FIG. 4 is a voltage waveform showing processing operations of the PWM driving signal generator 34 and the PWM driving signal output module 35.

FIG. 4 is a voltage waveform showing processing operations of the PWM driving signal generator 34 and the PWM driving signal output module 35. FIG. 4 corresponds to time t1 to t4 of FIG. 3. FIG. 4 shows only the PWM signal Vup_in, the PWM signal Vup and the over current detection signal Voc. The PWM driving signal generator 34 generates the PWM signal Vup_in which is low only during a term ton among a cycle T. The duty ratio means ton/T, and during the term ton, the driving current Is is generated intermittently.

In FIG. 4, because the over current detection signal Voc is low during time t1 to t31, the PWM driving signal output module 35 outputs the PWM signal Vup_in as the PWM driving signal Vup as itself to the driver 4. When the over current detection signal Voc becomes high at time t31, the PWM driving signal output module 35 sets the PWM driving signal Vup to be high and turns the PMOS transistor Qup off. Because of this, the driving current Is of UV phase does not generate. Thus, when the over current is detected, the PWM driving signal output module 35 generates the PWM driving signal Vup whose duty ratio is lowered, thereby, preventing the motor M from being burned-out. After that, the PWM driving signal output module 35 sets the PWM driving signal Vup to be low again at time t32 after the next cycle T.

Time t1 to t4 of FIG. 3 corresponds to FIG. 4 where it is assumed that the duty ratio ton/T is "100" % and that the over current detection signal Voc is always low. Although the duty ratio is usually set under "100" % in practice, FIG. 3 is shown assuming that the duty ratio is "100" % for simplification.

Then, when the PWM driving signals Vup to Vwn are generated by the PWM driving signal output module 35, the driver 4 drives the motor M by generating the driving current Is by on-and-off-controlling the transistors Qup to Qwp (Step S9 of FIG. 2). FIG. 3 shows an example where the over current is not detected. When the PWM driving signals Vup, Vvp and Vwp are low, the PMOS transistors Qup, Qvp and Qwp of FIG. 1 are turned on, respectively. When the PWM driving signals Vun, Vvn and Vwn are high, the NMOS transistors Qun, Qvn and Qwn are turned on, respectively.

For example, during time t1 to t2 of FIG. 3, the PMOS transistor Qup and the NMOS transistor Qvn are turned on. Therefore, the driving current Is is generated on UV phase. Then, the driving current Is is generated on each phase by turns, and if the starting state is kept, the driving current Is is generated on UV phase during time t7 to t8 again. The forced commutation frequency of Step S3 in FIG. 2 means an inverse number of the term of time t1 to t7.

Because the PMOS transistor Qup is on during time t1 to t2, the connection node OUT-U of FIG. 1 is high. Furthermore, because the NMOS transistor Qvn is on, the connection node OUT-V is low. Additionally, both of the PMOS transistor Qwp and the NMOS transistor Qwn are off, the connection node OUT-W is high-impedance. Because the rotor hardly rotates in this time, the induction voltage does not occur on the connection node OUT-W. Therefore, the voltages of the connection nodes OUT-U and OUT-V are combined, and the combined voltage Vuvw becomes "Vdd/2". The voltage "Vdd/2" occurs on the connection node OUT-W which is high-impedance. Note that, that the connection node OUT-W becomes low instantaneously right after time t1. This is caused by a back electromotive force generated right after switching the driving current Is.

The combined voltage Vuvw is inputted to the position detecting comparator 21. The position detecting comparator 21 generates the position detection signal Vp which is a digital signal using the reference voltage Vref higher than the voltage "Vdd/2" as a threshold (Step S10 of FIG. 2). Therefore, the position detection signal Vp is low during time t1 to t2. In this time, the masking module 31 outputs the position detection signal Vp as the recognition signal Vq as itself. In this case, because the count value Vcnt of the number of the pulses stays in "0", the count value Vcnt is smaller than the threshold Vcnt_th (Step S12—NO), and the pulse comparator 33 determines that the motor M is in the starting state. That is, the determination signal Vj stays in low (Step S14).

During time t2 to t3 of FIG. 3, the connection nodes OUT-U, OUT-V and OUT-W are set to be high, high-impedance and low, respectively. Because the terminal OUT-V becomes high due to the back electromotive force right after time t2, the combined voltage Vuvw becomes higher. As a result, because the combined voltage Vuvw exceeds the reference voltage Vref, the position detecting comparator 21 temporary sets the position detection signal Vp to be high. After that, because the rotor hardly rotates yet, the combined voltage Vuvw becomes "Vdd/2". Therefore, the position detecting comparator 21 sets the position detection signal Vp to be low. The masking module 31 masks the temporal term where the position detection signal Vp is high, and sets the recognition signal Vq to be low through time t2 to t3. The term of time t3 to t4 is similar to that of time t2 to t3.

As stated above, the masking module 31 removes the instantaneous undesired pulse generated by the back electromotive force. Because the back electromotive force occurs when the current phase is switched, the masking module 31 can remove the undesired pulse by generating the recognition signal Vq ignoring logic inverses of the position detection signal Vp when switching the current phase.

During time t4 to t5, the connection nodes OUT-V, OUT-U are set to be high and low, respectively. Furthermore, the connection node OUT-W is set to be high-impedance. If the rotor starts to rotate at this time, the induction voltage occurs on the connection node OUT-W, and the voltage of the connection node OUT-W increases gradually, which is shown in FIG. 3. However, the rotation frequency is low and the induction voltage is small. Therefore, the combined voltage Vuvw does not exceeds the reference voltage Vref. Accordingly, the recognition signal Vq stays in low, and the pulse comparator 33 determines that the motor M is in the starting state (Step S14 of FIG. 2). The term of time t5 to t6 is similar to that of time t4 to t5.

During time t6 to t7, the PMOS transistor Qwp and the NMOS transistor Qvn are on. Furthermore, because the rotation frequency of the rotor becomes higher, as shown in FIG. 3, the voltage of the connection node OUT-U, which is set to be high-impedance, drastically increases, and the combined voltage Vuvw also drastically increases to exceed the reference voltage Vref at time t21. As a result, the position detection signal Vp becomes high, and the recognition signal Vq also becomes high.

Figure 5:
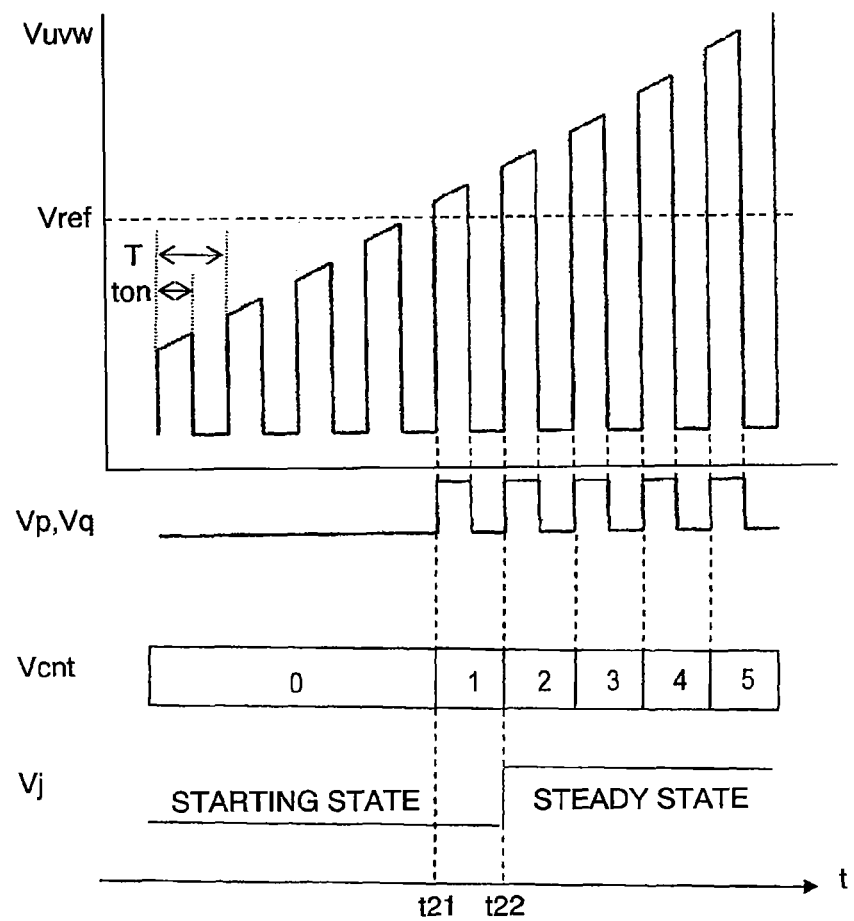
FIG. 5 is a voltage waveform of an enlarged part around time t21 of FIG. 3.

FIG. 5 is a voltage waveform of an enlarged part around time t21 of FIG. 3. Although FIG. 3 shows a case where the duty ratio is "100" %, FIG. 5 shows an example of a case where the duty ratio is "50" %.

When the duty ratio is not "100" %, the PMOS transistor Qwp and the NMOS transistor Qvn repeat on and off intermittently even during time t6 to t7. Therefore, as shown in FIG. 5, the combined voltage Vuvw increases discontinuously. As a result, the position detection signal Vp is not always high after time t21 but has a pulsed-waveform. For example, the position detection signal Vp is set to be high at time t21 and then set to be low once. After that, the position detection signal Vp is set to be high again at time t22. Here, because the back electromotive force is not generated around time t21, the masking module 31 outputs the position detection signal Vp as the recognition signal Vq as itself.

The pulse counter 32 counts the number of the pulses of the recognition signal Vq of pulsed-waveform. The combined voltage Vvuw exceeds the reference voltage Vref at time t21 (Step S10—YES of FIG. 2), and the first pulse is generated on the recognition signal Vq. Therefore, the pulse counter 32 increments the count value Vvnt by "1" to update the count value Vcnt to be "1" (Step S11).

Because the count value Vcnt is smaller than the threshold Vcnt_th of "2" (Step S12—NO), the pulse comparator 33 determines that the motor M is yet in the starting state (Step S14).

When the second pulse is generated on the recognition signal Vq at time t22 (Step S10—YES of FIG. 2), the pulse counter 32 updates the count value Vcnt to be "2" (Step S11). Because the count value Vcnt equals to the threshold Vcnt_th (Step S12—YES), the pulse comparator 33 determines the motor M to be in the steady state to set the determination signal Vj to be high (Step S13). After time t22, the motor M is determined to be in the steady state.

When the determination signal Vj is set to be high, the digital signal generator 11 sets the digital signal Vd to be the digital signal Vd2 for steady state, and the DAC 12 converts the digital signal Vd2 for steady state to the analog voltage to generate the over current detection voltage Vth2 for steady state (Step S15).

When the determination signal Vj is high, the PWM driving signal generator 34 determines that the motor M is in the steady state (Step S2—NO) and generates the PWM signals Vup_in to Vwn_in based on the recognition signal Vq (Step S4), as will be explained below. When the recognition signal Vq is set to be low at time t23 of FIG. 3, the PWM driving signal generator 34 switches the values of the PWM signals Vup_in to Vwn_in at time t8 which is after a constant time from the time 23. Furthermore, if a change of the value of the recognition signal Vq is detected within a predetermined time from time t23 (time t24 in a case of FIG. 3), the PWM driving signal generator 34 switches the values of the PWM signals Vup_in to Vwn_in at time t9 which is after a constant time from time t24. Similar to this, the PWM driving signal generator 34 generates the PWM signals Vup_in to Vwn_in using a switching timing of the recognition signal Vq as a reference.

Thus, in the steady state, the recognition signal Vq is generated in synchronization with the rotation of the rotor, and the controller generates the PWM driving signals based on the recognition signal Vq. That is, because the PWM driving signals are generated in synchronization with the rotation frequency of the rotor, the controller rotates the rotor stably.

On the other hand, because the motor M is in the steady state, the over current detector 1 compares the voltage Vs corresponding to the driving current Is not with the over current detection voltage Vth1 for starting state but with the over current detection voltage Vth2 for steady state to detect the over current (Step S6 of FIG. 2).

The controller performs the above operating processing until the driving order signal IN indicates to stop the motor M (Step S16). By such a manner, in the present embodiment, by determining whether the motor M is in the starting state or in the steady state, it can be determined whether or not the driving current Is is the over current using the over current detection voltage Vth according to the operating state of the motor M.

Figure 6:
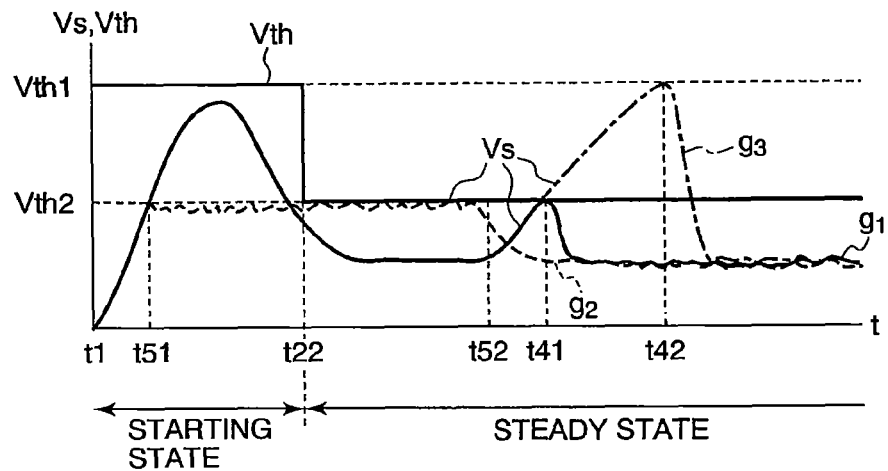
FIG. 6 is an example of setting the over current detection voltage Vth for starting state and steady state.

FIG. 6 is an example of setting the over current detection voltage Vth for starting state and steady state. The vertical axis shows the over current detection voltage Vth and the voltage Vs corresponding to the driving current Is, and the horizontal axis shows time. FIG. 6 takes into consideration driving the motor M having a small torque characteristic with heavy inertia. In a case of driving such a motor M, because it is necessary to generate a large driving current on starting the motor M, the over current detection voltage Vth1 for starting state is set large. Contrarily, the over current detection voltage Vth2 for steady state is set small in order to surely detect the over current.

A curve g1 shows the voltage Vs corresponding to the driving current Is in a case of setting the over current detection voltage Vth as shown in FIG. 6. Here, the voltage Vs corresponding to the driving current Is is proportional to the driving current Is. During the starting state (time t1 to t22), because the over current detection voltage Vth1 is large, the controlling module 3 generates the large driving current Is. Therefore, the motor M becomes steady state quickly at time t22. On the other hand, because the over current detection voltage Vth2 is small, the voltage Vs corresponding to the driving current Is reaches the over current detection voltage Vth2 at time t41 even if the over current starts to flow due to a dead lock and so on. Thus, the over current can be detected quickly, thereby, preventing the motor M from being burned-out.

If only a constant over current detection voltage Vth can be set for both of the starting state and the steady state, the following problems may occur.

If the over current detection voltage Vth is set to be a constant voltage Vth2 in order to prevent the motor M from being burned-out, the voltage Vs corresponding to the driving current Is becomes a curve g2. In this case, the voltage Vs corresponding to the driving current Is immediately reaches the over current detection voltage Vth2 at time t51 after starting. Therefore, the controlling module 3 cannot generate the larger driving current Is. As a result, it takes a long time for the motor M to be in the steady state. FIG. 6 shows an example where the motor M becomes the steady state at time t52, which is delayed much more than time t22.

If the over current detection voltage Vth is set to be a constant voltage Vth1 in order to set the motor M to be the steady state quickly, the voltage Vs corresponding to the driving current Is becomes a curve g3. In this case, similar to the curve g1, the motor M becomes steady state at time t22. However, when the over current is generated, the over current is detected at time t42, which is later than time t41. Because the large driving current Is is generated during the time t41 to t42, the motor M may be burned-out.

On the other hand, in the present embodiment, the over current detection voltage Vth is set to be high (Vth1) for starting state and low (Vth2) for steady state. Therefore, the motor M can be surely activated and prevented from being burned-out.

Figure 7:
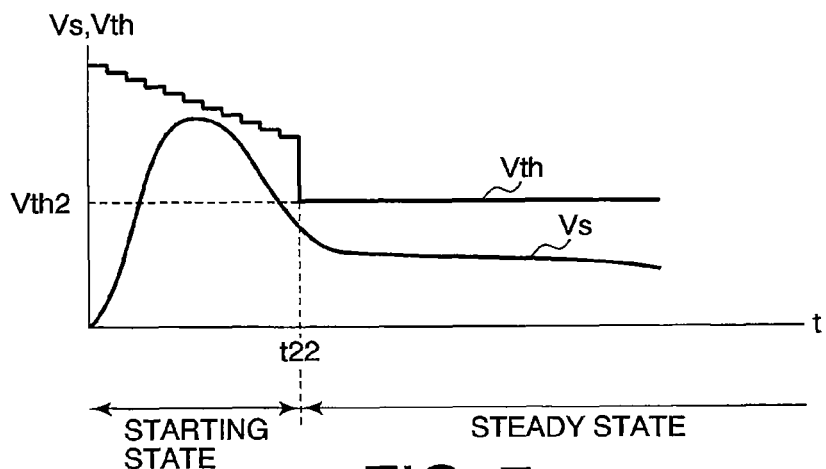
FIG. 7 is another example of setting the over current detection voltage Vth for starting state and steady state.

FIG. 7 is another example of setting the over current detection voltage Vth for starting state and steady state. In FIG. 7 shows an example where the over current detection voltage Vth1 for starting state approaches to the over current detection voltage. Vth2 for steady state as time advances. Such over current detection voltage Vth can be implemented by setting the digital signal Vd1 for starting state to approach the digital signal Vd2 for steady state gradually in synchronization with the phase switching of the driving current Is and so on.

In this case, the motor M becomes steady state at time t22, which is similar to FIG. 6, and the over current can be detected quickly even if the large driving current Is is generated before time t22.

Figure 8:
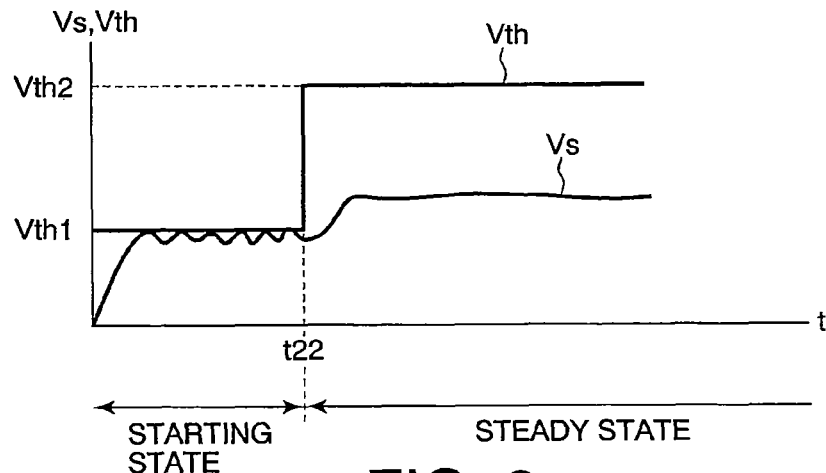
FIG. 8 is another example of setting the over current detection voltage Vth for starting state and steady state.

FIG. 8 is another example of setting the over current detection voltage Vth for starting state and steady state. FIG. 8 takes into consideration driving the motor M having a large torque characteristic with light inertia, which is different from FIGS. 6 and 7. In a case of driving such a motor M, the over drive may occur when the driving current Is on starting the motor M becomes too large. Therefore, the over current detection voltage Vth1 for starting state is set to be smaller than the over current detection voltage Vth2 for steady state.

Because of this, the driving current Is on starting the motor M can be kept smaller than the predetermined value, thereby, surely driving the motor M without causing the over drive.

As mentioned above, in the first embodiment, the controlling module 3 determines whether the motor M is in the starting state or in the steady state, and determines whether or not the driving current Is is the over current using the over current detection voltage Vth depending on the operating state of the motor as the threshold. Therefore, the problem on starting the motor M and burnout of the motor M can be avoided, thereby, surely driving the motor M regardless of the inertia and the torque characteristic thereof.

(Second Embodiment)

In the above described first embodiment, the over current detection voltage Vth is generated by the DAC 12. On the other hand, in a second embodiment, which will be described below, the over current is detected by a plurality of over current detecting comparators 13.

Figure 9:
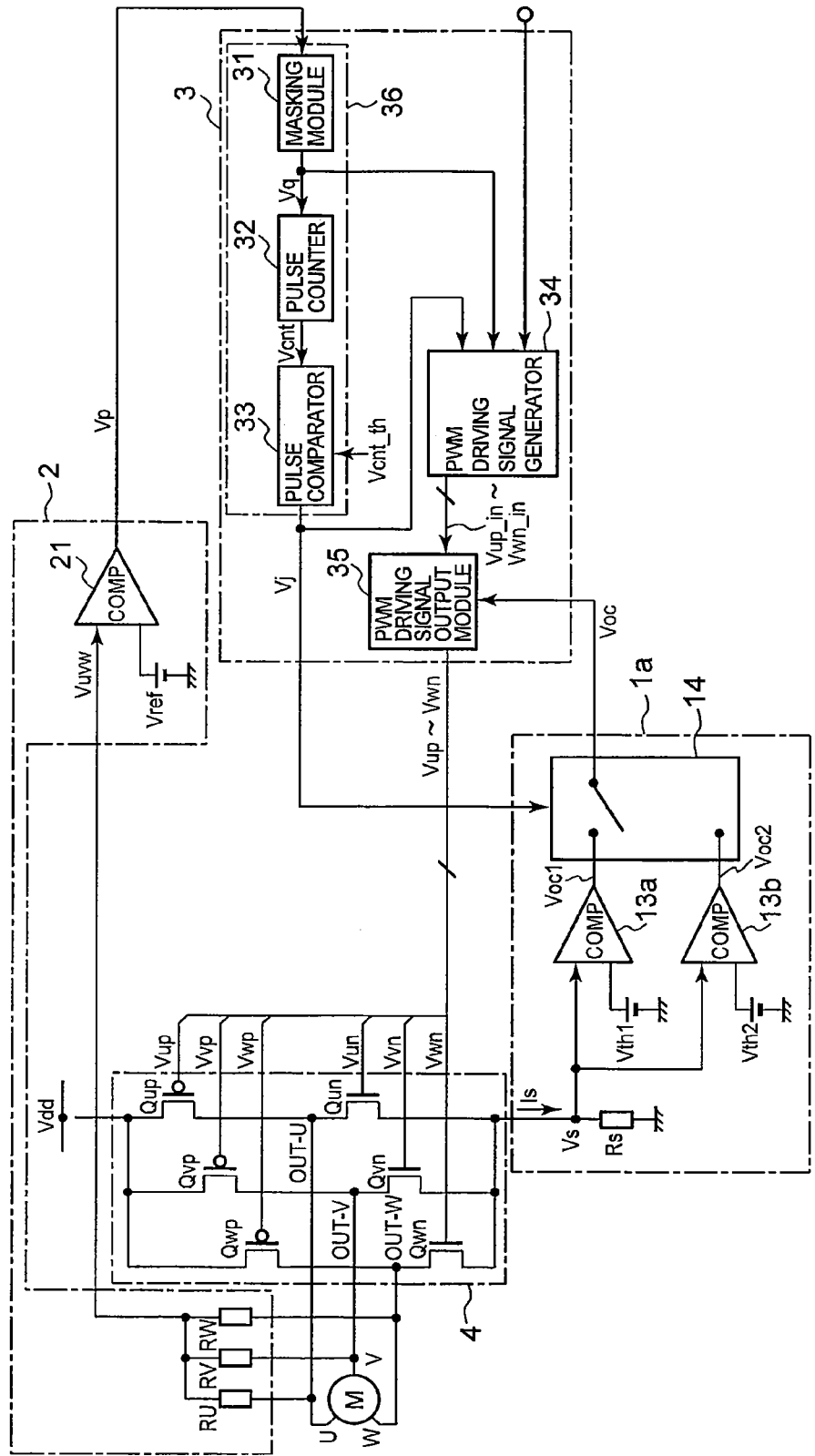
FIG. 9 is a schematic configuration of a controller and a motor M according to the second embodiment.

FIG. 9 is a schematic configuration of a controller and a motor M according to the second embodiment. In FIG. 9, components common to those of FIG. 1 have common reference numerals, respectively. Hereinafter, components different from FIG. 1 will be mainly described below.

An internal configuration of the over current detector is of the controller of FIG. 9 is different from that of FIG. 1. The over current detector is of FIG. 9 has an over current detecting comparator 13a, an over current detecting comparator 13b and a selector 14, instead of the digital signal generator 11 and the DAC 12.

The over current detecting comparator 13a (first comparator) compares the voltage Vs corresponding to the driving current Is with the over current detection voltage Vth1 for starting state. When the voltage Vs corresponding to the driving current Is exceeds the over current detection voltage Vth1 for starting state, the over current detecting comparator 13a sets the over current detection signal Voc1 for starting state to be high, otherwise, sets the over current detection signal Voc1 for starting state to be low. The over current detecting comparator 13b (second comparator) compares the voltage Vs corresponding to the driving current Is with the over current detection voltage Vth2 for steady state. When the voltage Vs corresponding to the driving current Is exceeds the over current detection voltage Vth2 for steady state, the over current detecting comparator 13b sets the over current detection signal Voc2 for steady state to be high, otherwise, sets the over current detection signal Voc2 for steady state to be low.

The selector 14 selects the over current detection signal Voc1 for starting state when the determination signal Vj is low, while selects the over current detection signal Voc2 for steady state when the determination signal Vj is high, to generate the over current detection signal Voc.

In the controller of FIG. 9, the over current detection voltage can be switched according to the operating state of the motor M by setting the over current detect voltage Vth1 for starting state and the over current detect voltage Vth2 for steady state depending on the inertia and the torque characteristic of the motor M as shown in FIG. 6 or FIG. 8. Therefore, similar to the first embodiment, the motor M can be surely driven. Furthermore, because the controller of FIG. 9 does not have the DAC 12, the circuit volume can be downsized compared to the controller of FIG. 1 of the first embodiment.

Additionally, by providing two or more than two comparators for starting state, the over current detection voltage Vth1 can be set more finely as shown in FIG. 7. Note that, the circuit volume becomes large by increasing the number of the comparator for starting steady. Therefore, it is preferable to select FIG. 1 of the first embodiment where the DAC 12 is used or FIG. 9 where the number of the comparator for stating steady is increased, according to which can downsize the circuit volume.

As mentioned above, in the second embodiment, a plurality of the over current detection comparators are provided to determine whether or not the driving current Is is the over current using the over current detection voltage depending on the operating state of the motor M. Therefore, similar to the first embodiment, the problem on starting the motor M and burnout of the motor M can be avoided, thereby, surely driving the motor M. Furthermore, the circuit volume can be downsized because the comparators are used instead of the DAC 12.

(Third Embodiment)

In a third embodiment, which will be described below, a low pass filter operation is performed on the voltage Vs corresponding to the driving current Is.

Figure 10:
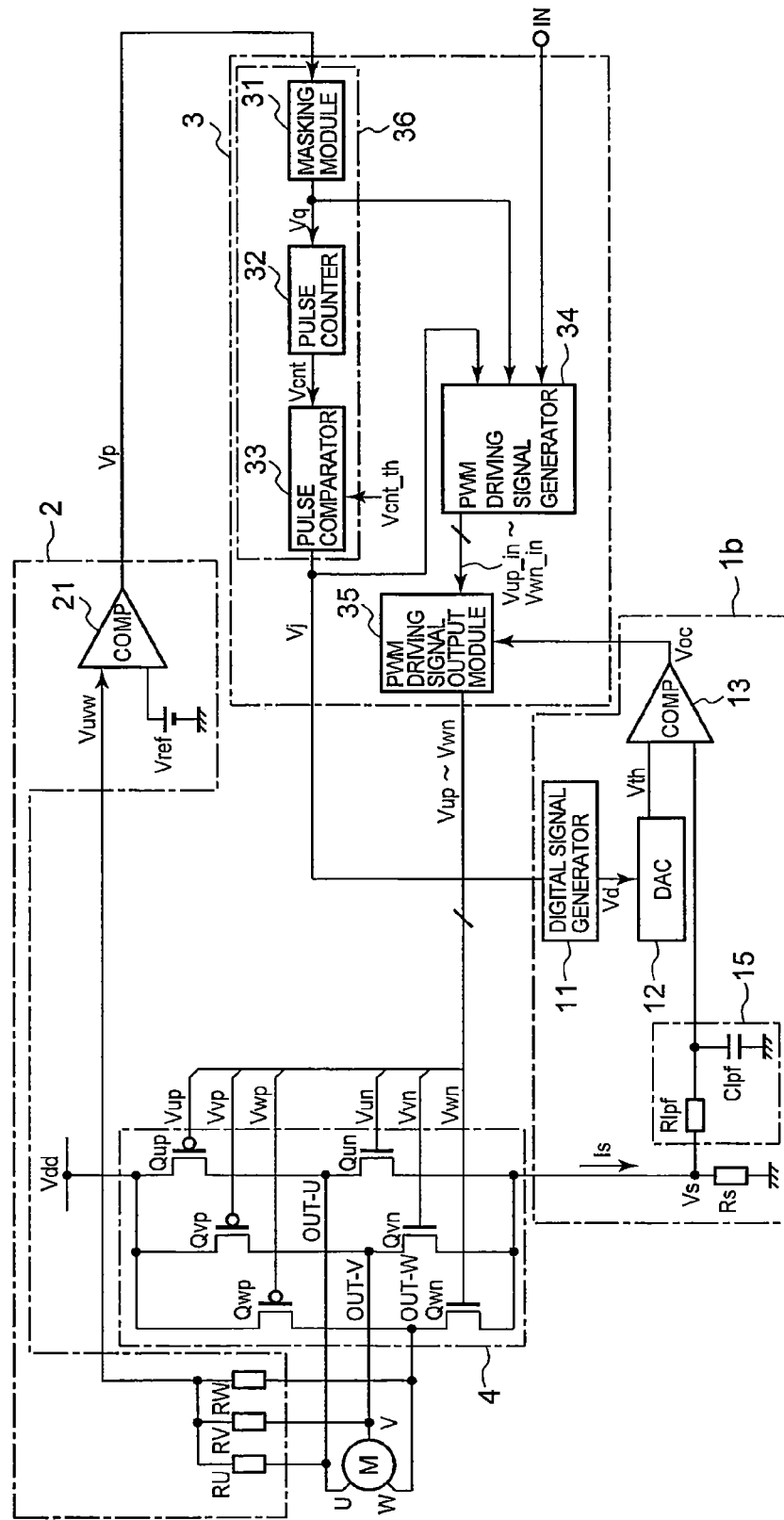
FIG. 10 is a schematic configuration of a controller and a motor M according to the third embodiment.

FIG. 10 is a schematic configuration of a controller and a motor M according to the third embodiment. In FIG. 10, components common to those of FIG. 1 have common reference numerals, respectively. Hereinafter, components different from FIG. 1 will be mainly described below.

The over current detector 1b of FIG. 10 has a LPF 15 in addition to the over current detector 1 of FIG. 1. The voltage Vs corresponding to the driving current Is is inputted to the LPF 15, and a voltage Vs_Ipf, which is the output thereof, is inputted to the over current detecting comparator 13. The LPF 15 has a resistance RIpf connected between the input terminal and the output terminal of the LPF 15 and a capacitance CIpf connected between the output terminal and the ground terminal, for example.

The LPF 15 performs a low pass filter operation on the voltage Vs corresponding to the driving current Is to generate the voltage Vs_Ipf whose immediate alternation is suppressed by removing a high frequency component.

Figure 11A:
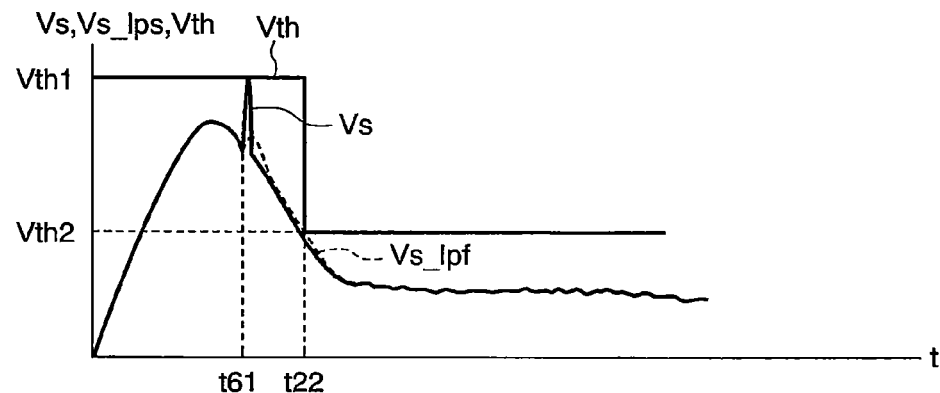
FIG. 11A shows a voltage waveform where the LPF 15 is provided according to the present embodiment.
Figure 11B:
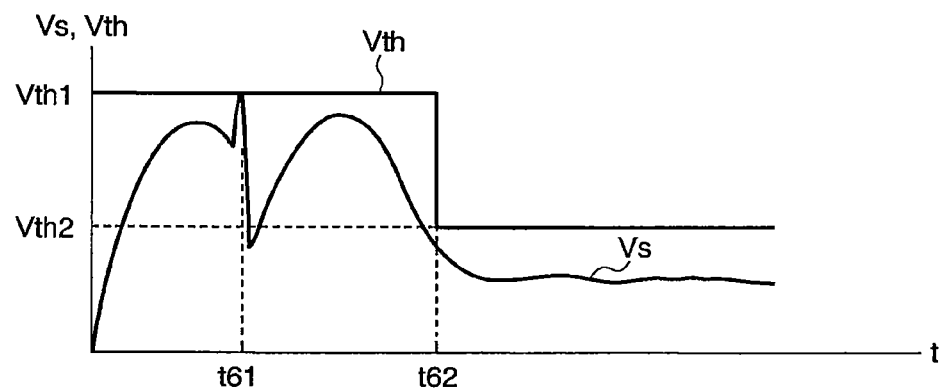
FIG. 11B shows a voltage waveform where the LPF 15 is not provided.

FIGS. 11A and 11B are voltage waveforms where the over current detection voltage Vth, the voltage Vs corresponding to the driving current Is and the voltage Vs_Ipf are compared between the presence of the LPF 15 and absence thereof. FIG. 11A shows a voltage waveform where the LPF 15 is provided according to the present embodiment. FIG. 11B shows a voltage waveform where the LPF 15 is not provided. The vertical axis and the horizontal axis are similar to the FIG. 6. An example is shown where the over current detection voltage Vth is set similar to FIG. 6.

Due to some reason, the large driving current Is is generated instantaneously at time t61, and the voltage Vs corresponding to the driving current Is reaches the over current detection voltage Vth1. In this case, if the LPF 15 is not provided, the over current is detected as shown in FIG. 11B. Then, the duty ratio of the PWM driving signals Vup to Vwn generated by the controlling module 3 is lowered. As a result, it takes a long time for the motor M to be in the steady state.

In practice, if a term is so short when the voltage Vs corresponding to the driving current Is exceeds the over current detection voltage Vth, the motor M is not burned-out.

Therefore, in the present embodiment, the LPF 15 generates the voltage Vs_Ipf whose immediate alternation is suppressed, and the over current detector 1b determines whether or not the over current is generated based on the voltage Vs_Ipf. Accordingly, if the voltage Vs corresponding to the driving current Is reaches the over current detection voltage Vth1 instantaneously, the voltage Vs_Ipf does not reach the over current detection voltage Vth1 as shown if FIG. 11A. Therefore, the PWM driving signal output module 35 can generate the PWM driving signals Vup to Vwn without lowering the duty ratio of the PWM signals Vup_in to Vwn_in generated by the PWM driving signal generator 34. As a result, the motor M becomes the steady state at time t22, similar to FIG. 6.

Not that, in FIG. 10, although the LPF 15 is added to the over current detector 1 of FIG. 1, the LPF 15 can be added to the over current detector 1a of FIG. 9.

As mentioned above, in the third embodiment, the LPF 15 is provided, and the over current is detected based on the voltage Vs_Ipf whose immediate alternation of the voltage Vs corresponding to the driving current Is is suppressed. Therefore, the motor M can be in the steady state quickly even if the over current is generated in only an extremely short term.

(Fourth Embodiment)

In the above described first to third embodiments, the forced commutation frequency is constant, and the over current detection voltage is switched depending on whether the motor M is in the starting state or in the steady state. On the other hand, in a fourth embodiment, which will be described below, the forced commutation frequency gradually becomes higher in the starting state.

The schematic configuration of the controller of the motor according to the fourth embodiment is similar to that of FIG. 1. However, the processing operation of the PWM driving signal generator 34 differs.

Figure 12:
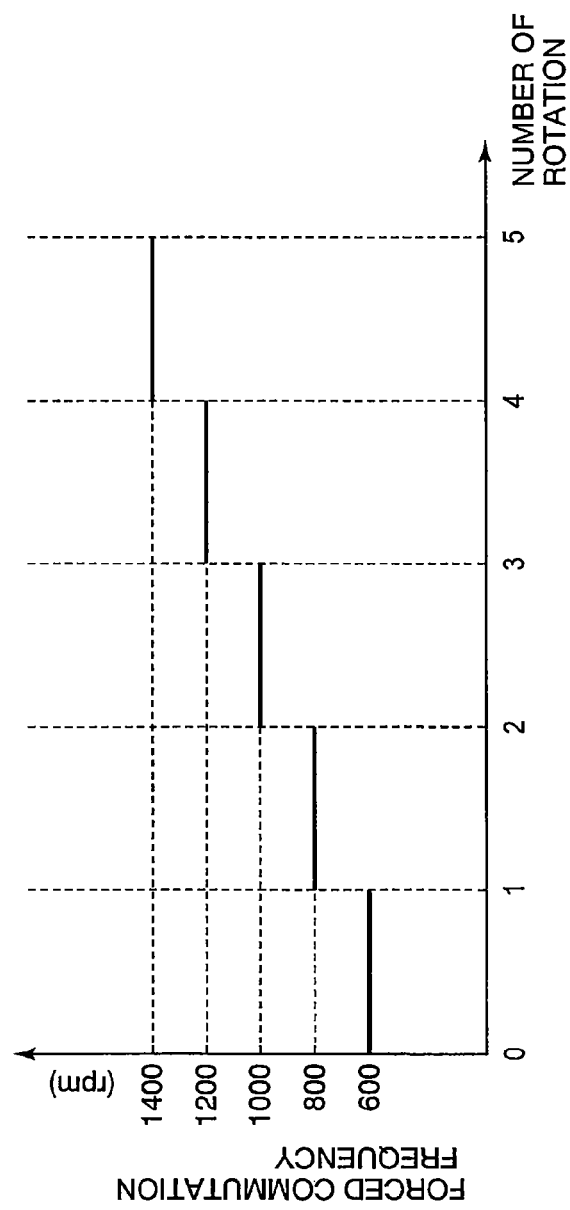
FIG. 12 is a graph showing a relationship between the forced commutation frequency of the PWM signals Vup_in to Vwn_in generated by the PWM driving signal generator 34 and the number of rotations.

FIG. 12 is a graph showing a relationship between the forced commutation frequency of the PWM signals Vup_in to Vwn_in generated by the PWM driving signal generator 34 and the number of rotations. Here, in the term of the number of rotations, the time t1 to t6 in FIG. 3 is one rotation, for example. In an example of FIG. 12, the PWM driving signal generator 34 generates the PWM signal whose forced commutation frequency is "600" rpm right after the starting. Then, the forced commutation frequency is set higher as the number of the rotations increases. Finally, the forced commutation frequency reaches "1400" rpm. That is, the forced commutation frequency is set higher as time advances in the starting state.

When driving the motor having a small torque characteristic with heavy inertia, the above mentioned manner is especially effective. Even if driving such a motor by the PWM signals with a high forced commutation frequency from the first, the rotor cannot follow the PWM signals when the torque is small. Therefore, the rotor is rotated by the PWM signals with a low forced commutation frequency (for example of FIG. 12, "600" rpm) right after the starting, and in synchronization with the rotor whose rotating frequency becomes higher, the forced commutation frequency is set higher. When the rotating frequency of the rotor becomes higher, the pulsed-waveform is generated (FIG. 5) on the recognition signal Vq due to the induction voltage, and the motor becomes the steady state. Therefore, the PWM signals are generated based on the recognition signal Vq, as explained in the first embodiment. By such a manner, the motor M having a small torque characteristic with the heavy inertia can be surely driven.

The motor M having a small torque characteristic with heavier inertia can be surely driven by setting the forced commutation frequency right after the starting to be lower (for example, 100 rpm). Contrary, when driving the motor M having a large torque characteristic with light inertia, the motor M can be set to be the steady state in a shorter time by setting the forced commutation frequency higher (for example, 1000 rpm). Note that, when the forced commutation frequency is too high, there is a likelihood that the over drive may occur. Therefore, the PWM driving signal generator 34 has to generate the PWM signals at the proper forced commutation frequency depending on the motor M.

Here, FIG. 12 shows an example where the forced commutation frequency is set higher by one step when the motor M rotates one time. The forced commutation frequency can be set higher when the motor M rotates multiple predetermined times, or can be set higher by multiple steps in synchronization with the switching of the current phase and so on in one rotation.

The over current detection voltage Vth can be set constant independent of the operating state of the motor M, and the control of the forced commutation frequency of the present embodiment can be performed. Additionally, by performing the above mentioned control of the forced commutation frequency on the controller of one of FIG. 1, FIG. 9 and FIG. 10, the motor M can be surely driven compared to the first to the third embodiments.

As mentioned above, in the fourth embodiment, because the forced commutation frequency is set higher gradually, the motor M can be surely started.

Each part in the controller of FIG. 1 and so on is just an example, and various modifications can be conceivable. For example, at least a part of the MOS transistors in the driver 4 can be composed of other semiconductor devices such as bipolar transistors and Bi-CMOS transistors. Furthermore, it is possible to inverse the conductive type of the transistors and to modify the polarities of the PWM driving signals Vup to Vwn according to the inversed conductive type. Also in this case, the basic operation principle is similar to the above mentioned embodiments.

The controller according to each embodiment can be formed on a semiconductor substrate or a part thereof can be formed on another semiconductor substrate. The controller can be implemented on a printed circuit board using discrete parts.

At least a part of the controller explained in the above embodiments can be formed of hardware or software.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A controller of a motor comprising:
a driving signal output module configured to generate a driving signal for generating a driving current of a motor, a duty ratio of the driving signal is dependent on an over current detection signal;
a position detector configured to generate a position detection signal for determining an operating status of the motor by comparing an induction voltage generated by a rotation of a rotor of the motor in response to the driving current with a predetermined reference voltage;
a determiner configured to determine, based on the position detection signal, whether the motor is in a starting state in which a rotating frequency of the rotor is smaller than a predetermined value or in a steady state in which the rotating frequency of the rotor is equal to or higher than the predetermined value; and
an over current detector configured to output a comparison result as the over current detection signal by comparing a first over current detection voltage with a voltage corresponding to the driving current of the motor when the motor is in the starting state, and by comparing a second over current detection voltage that is different from the first over current detection voltage with the voltage corresponding to the driving current of the motor when the motor is in the steady state, in accordance with a determination result of the determiner.

2. The controller of claim 1, wherein the over current detector comprises:
a digital signal generator configured to generate a first digital signal corresponding to the first over current detection voltage when the motor is in the starting state and a second digital signal corresponding to the second over current detection voltage when the motor is in the steady state, in accordance with the determination result of the determiner;
a digital to analog converter configured to convert, respectively, the first and the second digital signals to the first and the second over current detection voltages; and
a comparator configured to generate the over current detection signal by comparing the first or the second over current detection voltage with the voltage corresponding to the driving current.

3. The controller of claim 2, wherein the digital signal generator is configured to generate the first digital signal so that the first over current detection voltage approaches the second over current detection voltage as time advances.

4. The controller of claim 2, wherein the digital signal generator is configured to set the first and the second over current detection voltages according to inertia and a torque characteristic of the motor.

5. The controller of claim 1, wherein the over current detector is configured to comprise:
a first comparator configured to compare the first over current detection voltage with the voltage corresponding to the driving current;
a second comparator configured to compare the second over current detection voltage with the voltage corresponding to the driving current; and
a selector configured to:
select a comparison result of the first comparator when the motor is in the starting state;
select a comparison result of the second comparator when the motor is in the steady state; and
output the selected comparison result as the over current detection signal in accordance with the determination result of the determiner.

6. The controller of claim 1, wherein the driving-signal output module is configured to generate the driving signal such that a frequency of the driving signal becomes higher as time advances when the motor is in the starting state, and to generate the driving signal based on the position detection signal when the motor is in the steady state in accordance with the determination result of the determiner.

7. The controller of claim 6, wherein the driving signal output module is configured to set the frequency of the driving signal according to inertia and a torque characteristic of the motor when the motor is in the starting state.

8. The controller of claim 1, wherein the driving signal is a PWM (Pulse Width Modulation) signal whose duty ratio is less than 100%, and the determiner is configured to determine that the motor is in the steady state when the position detection signal is detected at predetermined times.

9. The controller of claim 1, wherein the over current detector comprises a LPF (Low Pass Filter) configured to perform a LPF operation on the voltage corresponding to the driving current.

10. A method of controlling a motor comprising:
generating a driving signal for generating a driving current of a motor, a duty ratio of the driving signal is dependent on an over current detection signal;
generating a position detection signal for determining an operating status of the motor by comparing an induction voltage generated by a rotation of a rotor of the motor in response to the driving current with a predetermined reference voltage;
determining, based on the position detection signal, whether the motor is in a starting state in which a rotating frequency of the rotor is smaller than a predetermined value or in a steady state where the rotating frequency of the rotor is equal to or higher than the predetermined value; and outputting a comparison result as the over current detection signal by comparing a first over current detection voltage with a voltage corresponding to the driving current of the motor when the motor is in the starting state, and by comparing a second over current detection voltage that is different from the first over current detection voltage with the voltage corresponding to the driving current of the motor when the motor is in the steady state in accordance with the determination result.

11. The method of claim 10, wherein outputting the comparison result as the over current detection signal comprises:

generating a first digital signal corresponding to the first over current detection voltage when the motor is in the starting state;

generating a second digital signal corresponding to the second over current detection voltage when the motor is in the steady state;

converting, respectively, the first and the second digital signals to the first and the second over current detection voltages; and generating the over current detection signal by comparing the first or the second over current detection voltage with the voltage corresponding to the driving current.

12. The method of claim 11, wherein the first over current detection voltage approaches the second over current detection voltage as time advances.

13. The method of claim 11, wherein the first and the second over current detection voltages are set according to inertia and a torque characteristic of the motor.

14. The method of claim 10, wherein outputting the comparison result as the over current detection signal comprises:

comparing the first over current detection voltage with the voltage corresponding to the driving current;

comparing the second over current detection voltage with the voltage corresponding to the driving current;

when the motor is in the starting state, selecting a comparison result of comparing the first over current detection voltage with the voltage corresponding to the driving current;

when the motor is in the steady state, selecting a comparison result of comparing the second over current detection voltage with the voltage corresponding to the driving current; and outputting the selected comparison result as the over current detection signal in accordance with the determination result.

15. The method of claim 10, wherein a frequency of the driving signal becomes higher as time advances when the motor is in the starting state, and wherein the driving signal is generated based on the position detection signal when the motor is in the steady state.

16. The method of claim 15, wherein the frequency of the driving signal is set according to inertia and a torque characteristic of the motor when the motor is in the starting state.

* * * * *